(12) United States Patent
Qahwash et al.

(10) Patent No.: US 8,452,306 B2
(45) Date of Patent: May 28, 2013

(54) GPS-BASED LOCATION SYSTEM AND METHOD

(75) Inventors: Murad Qahwash, Orlando, FL (US); Madjid A. Belkerdid, Casselberry, FL (US)

(73) Assignee: MU Research & Development Grove, LLC, Orlando, FL (US)

( * ) Notice: Subject to any disclaimer, the term of this patent is extended or adjusted under 35 U.S.C. 154(b) by 163 days.

(21) Appl. No.: 13/013,755

(22) Filed: Jan. 25, 2011

(65) Prior Publication Data

US 2011/0207476 A1 Aug. 25, 2011

Related U.S. Application Data

(60) Provisional application No. 61/298,504, filed on Jan. 26, 2010.

(51) Int. Cl.
*H04W 24/00* (2009.01)

(52) U.S. Cl.
USPC .......... 455/456.2; 455/456.1; 455/456.3; 455/456.5; 455/456.6; 340/901; 340/902; 340/903; 340/905

(58) Field of Classification Search
USPC .. 455/456.1–456.6, 414.1, 458; 340/901–905; 701/213; 348/149
See application file for complete search history.

(56) References Cited

U.S. PATENT DOCUMENTS

| | | | |
|---|---|---|---|
| 4,804,937 A | 2/1989 | Barbiaux | |
| 5,014,206 A | 5/1991 | Scribner | |
| 5,119,102 A | 6/1992 | Barnard | |
| 5,613,199 A * | 3/1997 | Yahagi | 455/426.1 |
| 5,724,660 A | 3/1998 | Kauser | |
| 6,249,252 B1 | 6/2001 | Dupray | |
| 6,681,099 B1 | 1/2004 | Keranen | |
| 6,745,124 B2 * | 6/2004 | Aloi et al. | 701/484 |
| 7,272,357 B2 * | 9/2007 | Nishiga et al. | 455/11.1 |
| 7,603,232 B2 * | 10/2009 | Sin et al. | 701/484 |
| 7,729,706 B2 * | 6/2010 | Kim et al. | 455/456.1 |
| 7,974,639 B2 * | 7/2011 | Burroughs et al. | 455/456.2 |
| 8,254,960 B1 * | 8/2012 | Ge | 455/456.1 |

(Continued)

OTHER PUBLICATIONS

Cong and Zhuang, Hybrid TDOA/AOS Mobile User Location for Wideband CDMA Cellular Systems, IEEE Transactions on Wireless Communications, pp. 439-447, vol. 1, No. 3, Jul. 2002.

(Continued)

*Primary Examiner* — Olumide T Ajibade Akonai
(74) *Attorney, Agent, or Firm* — John L. DeAngelis; Beusse Wolter Sanks Mora & Maire, P.A.

(57) ABSTRACT

A system for locating an object, comprising one or more of a first GPS receiver and a first long and short range transceiver onboard a subject object at a first location; one or more of a second GPS receiver and a second long and short range transceiver onboard a secondary object at a second location; a control center for transmitting a location query message requesting first location information; the first long range transceiver transmitting the first location information to the control center, or the first short range transceiver transmitting the first location information and a subject object identification to the second short range transceiver, that transmits the first location information and the subject object identification to the control center, or the second long range transceiver transmitting the second location information to the control center when the subject object and the secondary object are within a predetermined distance.

1 Claim, 4 Drawing Sheets

U.S. PATENT DOCUMENTS

| | | | |
|---|---|---|---|
| 2002/0055362 A1 | 5/2002 | Aoyama | |
| 2003/0222819 A1 | 12/2003 | Karr | |
| 2003/0222820 A1 | 12/2003 | Karr | |
| 2008/0207227 A1* | 8/2008 | Ren et al. | 455/458 |
| 2008/0254814 A1* | 10/2008 | Harris et al. | 455/458 |
| 2010/0135178 A1* | 6/2010 | Aggarwal et al. | 370/252 |
| 2010/0222084 A1 | 9/2010 | Butterfield | |
| 2010/0228434 A1* | 9/2010 | Leyerle | 701/36 |
| 2011/0109475 A1* | 5/2011 | Basnayake et al. | 340/902 |

OTHER PUBLICATIONS

Gu and Rappaport, A Dynamic Location Tracking Strategy for Mobile Communication Systems, Technical Report No. 741, Jul. 1997, State University of New York at Stony Brook, College of Engineering and Applied Sciences.

Real Time Locations Systems White Paper, Version 1.02, Nanotron Technologies GmbH, Berlin, Germany, Published May 30, 2007, Document ID NA-06-0148-0391-1.02.

NanoLOC TRX Transceiver (NA5TR1) Datasheet Version 2.3, Nanotron Technologies GmbH, Berlin, Germany, Document No. NA-09-0230-0388-2.3, this version published Mar. 4, 2010 (Earlier versions referred to on p. 55).

NanoLOC Development Kit 3.0, Nanotron Technologies GmbH, Berlin, Germany, Document No. NA-08-S-0016-E-2.3, this version published Apr. 2010, (Earlier version published Feb. 2007).

* cited by examiner

GPS-BASED LOCATION SYSTEM AND METHOD

RELATED APPLICATIONS

The present application claims priority, under 35 U.S.C. 119(e), to the provisional patent application filed on Jan. 26, 2010, assigned application No. 61/298,504 and entitled GPS-Based Location System.

FIELD OF THE INVENTION

The present invention relates generally to locating a subject vehicle using GPS techniques and more specifically to employing various communications systems for providing the subject vehicle location to a system control center either directly from the subject vehicle or from a secondary vehicle.

BACKGROUND OF THE INVENTION

GPS location-receiving devices are commonly used in vehicles to provide the driver with location information and a route to a desired destination. The GPS receiver receives location-indicating signals from a constellation of GPS satellites, periodically updating the current location as the vehicle travels toward its destination. A GPS receiver system can also be used to geolocate stolen vehicles. The geodetic (location) data is sent back to a system computer for processing and completing the vehicle recovery process.

There are presently two systems for use in stolen vehicle recovery, referred to as the OnStar system and the LoJack system. A brief description of the operational features of these systems is presented below.

OnStar combines the services and functionality of emergency service providers, wireless telephones, and satellite communication technologies to provide emergency services to subscribers and allow them to stay connected to the system while on the road. The vehicle-based portion of the system is powered by the vehicle's battery. If the battery is damaged or disconnected, the system ceases operation. OnStar is a subscription-based communication system that provides for in-vehicle security, hands free calling, navigation, and remote diagnostics systems throughout North America. If GPS location information is lost, as provided by signals from the constellation of GPS satellites, navigation is not available through the OnStar system.

The LoJack system is a stolen vehicle recovery system comprising a small (hidden in the vehicle) radio transceiver capable of operating even after the vehicle battery has been disconnected. When a vehicle equipped with a LoJack system is stolen, the vehicle owner reports the incident to the police, and the LoJack unit in the vehicle is triggered by a signal sent from a LoJack control center. When activated, every tracking unit-equipped police car within a 2-3 mile radius is automatically alerted that the vehicle is near responsive to the vehicle transceiver. The system combines radio frequency (RF) technology with angle of arrival (AOA) technology to locate the vehicle. The LoJack signal propagates through structural walls, allowing the vehicle to be "seen" when hidden from view in garages or buildings. Obviously, it may take many hours for a LoJack-equipped vehicle to be located.

FIG. 1 depicts operation of one prior art system comprising a GPS receiver 10 onboard a vehicle 12. A long range location-requesting signal, for example from a GSM mobile phone, is received at an antenna 14 and carried to a system controller 16, which includes transceiver hardware that is not separately depicted. The system controller 16 determines the current location from the GPS receiver 10 and transmits a location response signal via the transceiver from an antenna 18.

BRIEF DESCRIPTION OF THE DRAWINGS

The present invention is explained in the following description in view of the drawings that show.

DETAILED DESCRIPTION OF THE INVENTION

Figure 1:
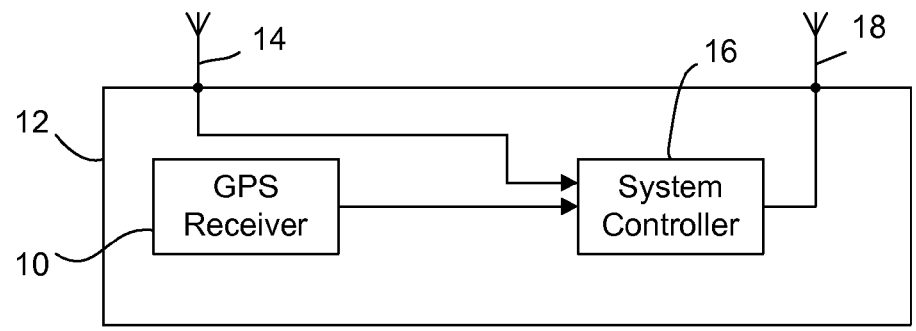
FIG. 1 is a block diagram depicting hardware components of a prior art location determining and location reporting system.

Before describing in detail exemplary methods and apparatuses related to the GPS aided location system according to the teachings of the present invention, it should be observed that the present invention resides primarily in a novel and non-obvious combination of specific functions and applications. So as not to obscure the disclosure with details that will be readily apparent to those skilled in the art, certain conventional elements and steps have been presented with lesser detail, while the drawings, and the specification describe in greater detail other elements and steps pertinent to understanding the invention. The illustrated process steps are exemplary, as one skilled in the art recognizes that certain independent steps illustrated below may be combined and certain steps may be separated into individual sub-steps to accommodate individual process variations.

The following embodiments are not intended to define limits of the structures or processes of the invention, but only to provide exemplary constructions. The embodiments are permissive rather than mandatory and illustrative rather than exhaustive.

The present invention is a novel, non-obvious and robust geo-locating system that electronically locates stolen, displaced, or lost vehicles, other articles, assets and objects of value. In its one or more embodiments and operational modes, the system employs one or more of a GPS receiver, a GSM (cell phone) transmitter and receiver providing both long and short range communications, UHF RF transceivers (transmitters and receivers), a short range transceiver operating in the ISM frequency band (Industrial, Scientific and Medical frequency band), long and short range transceivers, local area network technology and ranging technology. All system components can be embodied in one small and compact enclosure that can be hidden inside a vehicle. [016] The invention further can employ a novel method for geo-locating an object using a round trip time of arrival that is operative when GPS location signals are not available. Other location-determining techniques can also be used in conjunction with the present invention. The geodetic (location) data is sent to a system control center. The combination of the above technologies in one compact system makes the invention a robust service in the field of real time location systems (RTLS).

The system operates from a vehicle battery, but can operate from a local battery backup circuit when the vehicle battery is damaged or disconnected. The system includes an autonomous battery charging system for charging the backup battery by drawing power from the vehicle battery when the system is installed in a vehicle, for example. The system is automatically switched to battery backup operation when the vehicle battery power is not available. In an application where the object in which the system is installed lacks a battery, for example a child's bicycle, the system is powered from the backup battery. In this application battery life (and therefore system operation) is dependent on battery capacity and system activities.

The present invention determines a location of an object (e.g., a vehicle) and advises a system control center (i.e., a location-requesting site) of that location using one or more of a plurality of communications systems and location determining devices onboard a subject vehicle and/or onboard another vehicle (referred to as a secondary vehicle); the secondary vehicle in occasional proximate relation to the subject vehicle, as both the subject vehicle and the secondary vehicle travel. Both the subject vehicle and the secondary vehicle have one or more of a GPS receiver, a long range transceiver and a short range transceiver.

Generally, a subject vehicle having a GPS receiver transmits its own GPS latitude/longitude (lat/long) coordinate data to the system control center via the long range transceiver, e.g., a mobile phone transceiver.

The present invention is particularly advantageous when one of more of the GPS receiver, the long range transceiver and the short range transceiver in the subject vehicle are not operational or are not present in the vehicle. For example, assume the subject vehicle lacks an operational GPS receiver. When the long range transceiver of the subject vehicle receives a location query from the system control center, the subject vehicle broadcasts a location request via the short range transceiver. When received by the short range transceiver of a proximate secondary vehicle that is equipped with a GPS receiver, the secondary vehicle transmits its GPS latitude/longitude location and an identification of the subject vehicle to the system control center via the long range transceiver. Although the location of the secondary vehicle is not the same as the location of the subject vehicle, the error between these two locations is constrained by the range of the short range transceiver in the subject vehicle.

This operational mode is important when the subject vehicle, presumably a stolen vehicle, does not have a long range communications path to the system control center. e.g., the subject vehicle is hidden inside a garage or other structure. Providing the vehicle location data (either the location of the subject vehicle or the location of a proximate secondary vehicle) back to the system control center in a timely fashion is required to effect timely recovery of the subject vehicle.

Systems for determining a vehicle location are known. They include a GPS receiver, angle-of arrival systems, received signal strength indicator (RSSI) systems and TDOA techniques. Any of these systems can be employed to determine the location of the subject vehicle or of the secondary vehicle, as required.

The system can successfully supply location data for a subject vehicle according to several different scenarios.

Consider a first scenario where the subject vehicle has both a GPS lat/long receiver and a long range transceiver onboard; the short range transceiver either not present or not operational. Using known GPS techniques the subject vehicle can determine its location. Responsive to a location query message transmitted from the system control center (i.e., a location-requesting site) and received by the long range receiver on board the subject vehicle, the subject vehicle transmits its GPS-determined location to the control center using the long range transmitter. The long range transceiver may comprise a mobile phone or another RF communications device capable of transmitting over a distance of several miles.

According to a second scenario, assume that the short range and long range transceivers on the subject vehicle are operational and functioning normally, but the GPS lat/long data is not available, e.g., the GPS satellites are not in view or the GPS receiver in the subject vehicle has malfunctioned. Assume further the secondary vehicle has operational long range and short range transceivers and a GPS receiver. The subject vehicle receives a location query message from the system control center, receiving the message via its long range receiver. Responsive to the location query message, the subject vehicle periodically transmits a short range location query signal. When the secondary vehicle is within communications range (i.e., within the range of the short range communications system and hereinafter referred to as a short range distance) of the subject vehicle, the secondary vehicle receives the message, determines its location from its onboard GPS receiver, and advises the system control center of its GPS-determined location via the long range communications channel (e.g., via a text message). Thus the control center knows the location of the subject vehicle with the short range distance representing the maximum location error. The message from the secondary vehicle long range transceiver may include an identifier (a flag for example) indicating that the provided location information is the location of the secondary vehicle. Further this message may also include an identifier of the subject vehicle and/or an identifier of the secondary vehicle. Typically, the secondary vehicle pays for use of the long range communications channel in this scenario dependent on the type of service utilized (e.g., text message, voice call, data message).

According to a third scenario, the short range and long range transceivers on the subject vehicle are operational, but the GPS receiver is not available (e.g., the GPS satellites are not in view or GPS receiver has malfunctioned). Assume further that the long range and short range transceivers and the GPS receiver are operating normally on the secondary vehicle. The subject vehicle receives a location query message (from the system control center) from its long range receiver requesting its lat/long location. In response, the subject vehicle periodically transmits a short range signal. When one or more secondary vehicles are within short-range communications (i.e., within the range of the short range communications system and hereinafter referred to as a short range distance) of the subject vehicle, the secondary vehicle receives the message, determines its location from the onboard GPS receiver and replies to the message via the short range communications system. Upon receiving the short range reply message, which includes the location of the secondary vehicle, the subject vehicle advises the system control center of the GPS-determined location of the secondary vehicle (with the short range distance representing the maximum error in the location of the subject vehicle) via the long range communications path.

According to a fourth scenario, if the long range communications transceiver and the GPS receiver of the subject vehicle are not operational, a condition known by the system control center, the control center transmits a command to all network vehicles to locate the subject vehicle. Responsive thereto, the secondary vehicles periodically transmit a handshaking signal that includes an identification of the subject vehicle. Whenever the subject vehicle and one or more of the secondary vehicles are proximate, the subject vehicle receives the handshake signal and determines that it is the intended recipient. The subject vehicle sends a short range reply to the secondary vehicle(s). The receiving secondary vehicle transmits its location to the system control center, thereby answering the question "where is the subject vehicle?" The secondary vehicle and the control center are aware that the subject vehicle is close to the secondary vehicle due to the limited range of the short range transceiver, which typically operates at a low power level. The error associated with the location of the subject vehicle is therefore the short range distance.

According to a fifth scenario, assume that the GPS receiver and the short range transceiver are operational on the subject vehicle, but the long range transceiver is not functioning (e.g., no nearby antenna towers, malfunctioning, or RF propagation problems). Assume further all necessary systems are operational on the secondary vehicle, i.e., the long range and short range transceivers and the GPS receiver. The secondary vehicle receives a location query message (from the system control center) requesting a location of the subject vehicle. This message is received at the secondary vehicle via the long range receiver. The secondary vehicle periodically transmits a short range signal. When the subject vehicle is within communications range (i.e., within the range of the short range communications system and referred to as the short range distance) of the secondary vehicle, the subject vehicle receives the message, determines its location from the onboard GPS receiver and transmits a reply message via the short range communications system. Upon receiving the short range reply message, which includes the location of the subject vehicle, the secondary vehicle advises the system control center of the GPS-determined location of the subject vehicle via the long range communications path.

The length of time during which the secondary vehicle transmits the short range signal is selectable, and may comprise a predetermined time period, a predetermined number of transmissions or trails, or until a stop message is received from the system control center.

Alternatively the secondary vehicle can periodically transmit its handshaking signal and whenever the subject and secondary vehicles are near each other (as determined when the subject vehicle receives the short range signal and sends a reply) and the secondary vehicle receives the location query signal, the secondary vehicle transmits its location to the system control center, answering the question, "where is the first vehicle?" The secondary vehicle and the control center know the subject vehicle is close to the secondary vehicle because of the limited range of the low power short range transceiver. The error margin is equal to about the short range distance.

According to a sixth scenario only the short range transceiver is functional in the subject vehicle (valid GPS lat/long information is not available and the subject vehicle lacks an operational long range transceiver). Further, according to this scenario both the GPS and the long range and short range communications systems are functional in the secondary vehicle. A location query message requesting a location of the subject vehicle is received by the secondary vehicle. It can be determined that the subject and secondary vehicles are within the short range distance when short range signals are successfully transmitted/received between the subject vehicle and the secondary vehicle, irrespective of whether the short range link is initiated by the subject vehicle or by the secondary vehicle.

When the subject vehicle and the secondary vehicle are within the short range distance, the secondary vehicle determines its location using its GPS receiver and transmits the location information via the long range transceiver to the system control center. This location information represents an approximate location of the subject vehicle with a maximum error of the short range distance. However, according to this sixth scenario the reply message includes a flag indicating that the location information is in fact the location of the secondary vehicle and not the location of the subject vehicle as had been requested. Thus the location information may not be as accurate as desired, but allows the system control center to locate the subject vehicle by continually sending location querying messages. Any secondary vehicle within range of the short range transceiver on the subject vehicle can communicate with the subject vehicle, and the secondary vehicle relays the GPS lat/long data to the system control center via its long range transceiver. According to this approach, the control center can track the location of the subject vehicle by tracking the responding secondary vehicles.

According to yet a seventh scenario, a location of the subject vehicle having only an operational short range transceiver (the GPS receiver and the long range communications system are not operational) can be determined. The subject vehicle periodically broadcasts a message (e.g., a handshaking signal) for receiving by all secondary vehicles within the short range distance. A location query message is received by one or more secondary vehicles that have operational long and short range transceivers and an operational GPS receiver. Responsive to the location query message via the long range communications system and the short range message from the subject vehicle, each receiving secondary vehicle exchanges a unicast message with the subject vehicle. Each secondary vehicle then uses the signal round trip time to calculate a distance (d) between the transmitting secondary vehicle and the subject vehicle. Each secondary vehicle then transmits its lat/long data (as obtained from the secondary vehicle GPS receiver) and the distance (d) to the system control center via the long range path. If the control center receives location information and the distance (d) from three or more secondary vehicles, a triangulation method is used to determine a more accurate location of the subject vehicle. This method provides a more accurate location of the secondary vehicle than the scenarios described elsewhere herein that determine the location of the subject vehicle subject to a short range distance error.

The invention can also provide an area confinement feature. This feature is achieved by the broadcast of a periodic heartbeat transmitted by a short range transmitter from a fixed location. Any vehicle or device that does not receive any heartbeat signals during a predefined time transmits its lat/long location information to the system control center. The signals received at the control center identify those vehicles or devices that are outside the confinement area, since only vehicles and objects within the confinement area receive the heartbeat signals.

Figure 2:
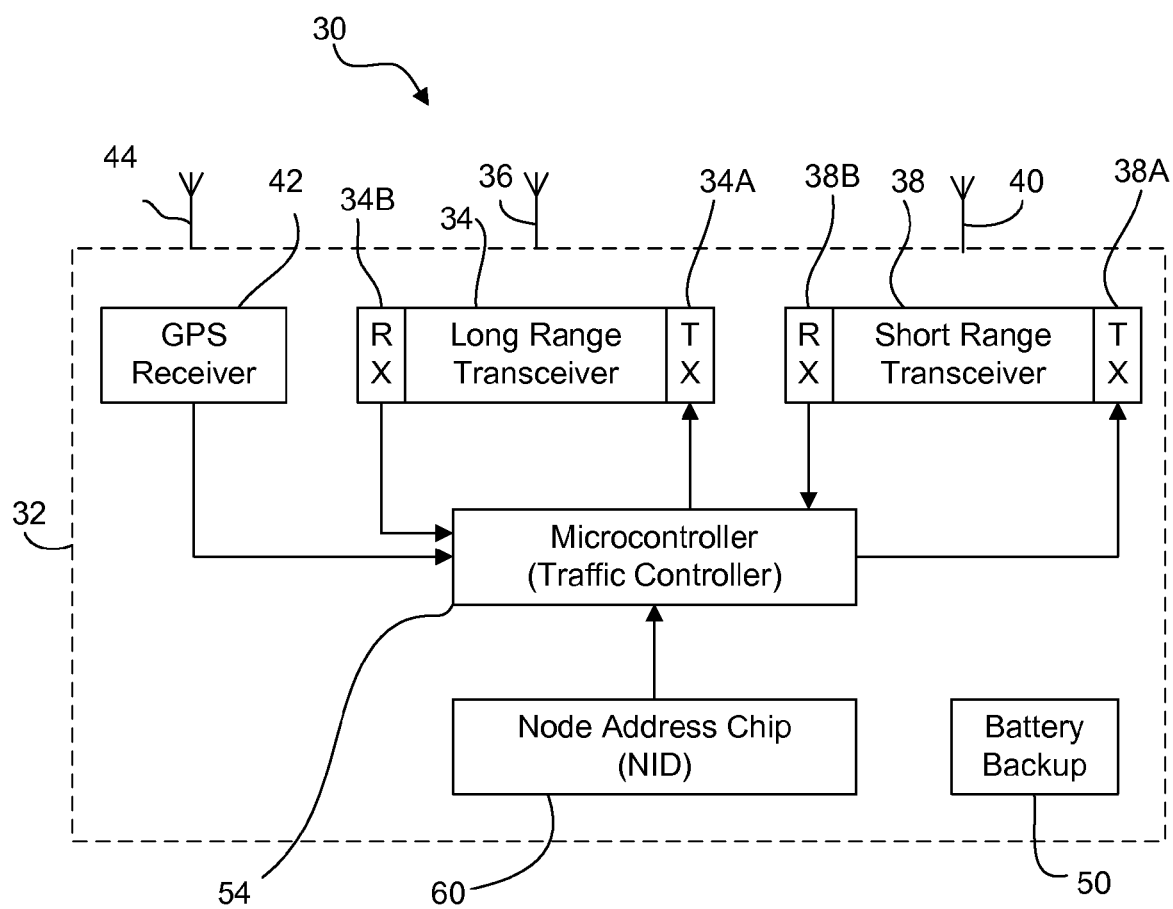
FIG. 2 is a block diagram of system components of the present invention disposed in a vehicle.

FIG. 2 depicts components of a location determining and reporting system 30 of the present invention as disposed in a vehicle 32. The components comprise: a long range transceiver 34 (further comprising a long range transmitter (TX) 34A and a long range receiver (RX) 34B) operative with an antenna 36; a short range transceiver 38 (further comprising a short range transmitter (TX) 38A and a short range receiver 38B) operative with an antenna 40; and a GPS receiver 42 operative with an antenna 44. The system further comprises a battery back-up system 50 for supplying operating power to the various components of the system 30 and a microcontroller 54 for controlling operation of the system components.

The microcontroller 54 (operating as a data and signal traffic controller) can send signals to the long range receiver 34B and the short range receiver 38B, and receive signals from the GPS receiver 42, the long range receiver 34B and the short range receiver 38B. Each system/vehicle is assigned a node ID (NID) as determined by a node address chip 60. In one example, the NID comprises a GSM phone number of a SIM card associated with the long range communications system (a mobile phone, for example).

Figure 3:
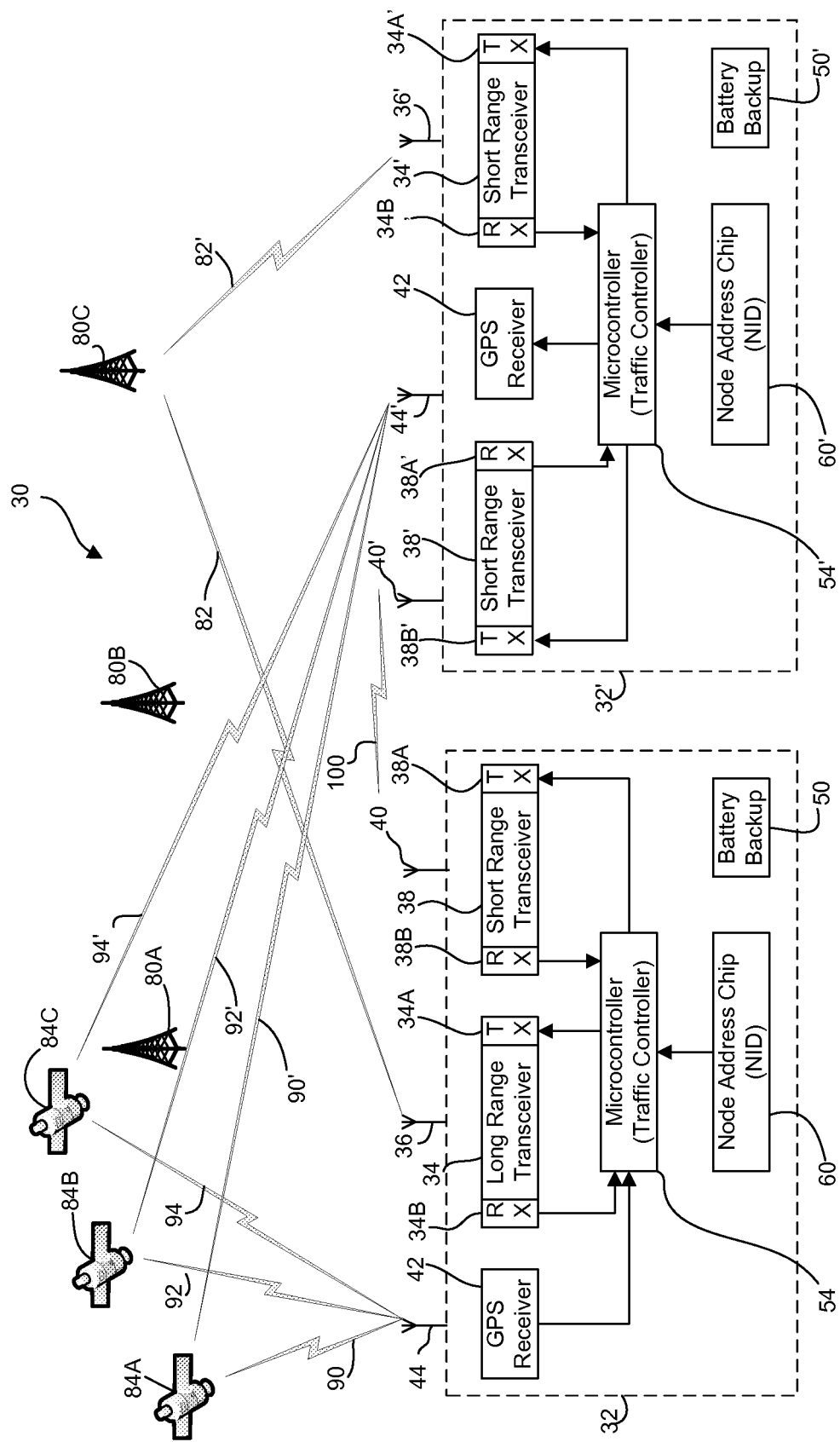
FIG. 3 is a block diagram of a geo-locating system according to the present invention.

FIG. 3 depicts a functional diagram of the present invention, including the various system components in vehicles 32 and 32' for use according to the various scenarios described above. This FIG. 3 further illustrates mobile phone towers 80A, 80B and 80C, with the tower 80C depicted as receiving and transmitting long range signals over a path 82 to the long range antenna 36 and over a path 82' to the long range antenna 36'. GPS satellites 84A, 84B and 84C each send a location signal to the GPS antenna 44 over respective paths 90, 92, and 94 and to the GPS antenna 44' over respective paths 90', 92' and 94'. Short range signals (and ranging signals in the scenarios that employ ranging signals) are carried between the vehicles 32 and 32' over a path 100 between the short range antennas 40 and 40'.

FIGS. 4-9 describe the various possible scenarios that can be addressed by the invention. The text within each figure represents a condition as follows.

Figure 4:
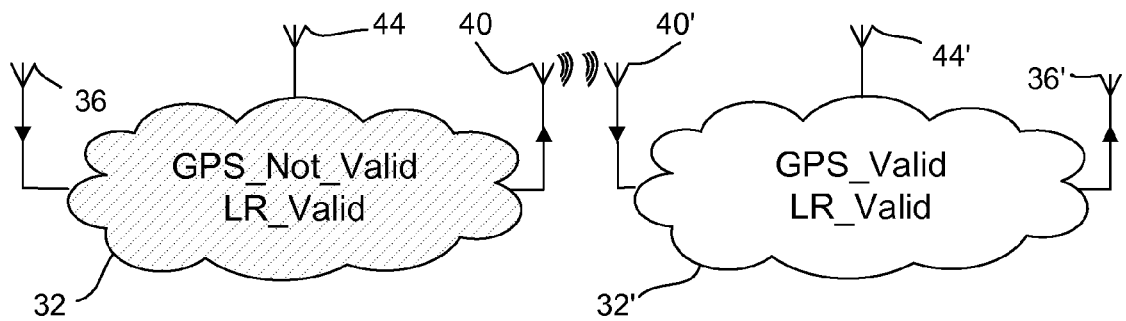
FIGS. 4-9 illustrate various conditions and components involved according to various scenarios of the present invention.

GPS_Not_Valid GPS is not operational
GPS_Valid GPS is operational
LR_Not_Valid The long range communications system is not operational
LR_Valid The long range communications system is operational FIG. 4 depicts the invention according to a scenario where the subject vehicle 32 receives a location request signal at the long range antenna 36 from the mobile phone tower 80C. But the subject vehicle 32 does not have valid GPS location information to respond to the request as no GPS signal has been received at the GPS antenna 44. The subject vehicle 32 therefore transmits a short range signal from the short range transceiver 38A via short range antenna 40. When the vehicles 32 and 32' are within the short range distance, the signal is successfully received by the short range antenna 40' and input to the short range receiver 38A'. Upon receipt, the secondary vehicle 32' transmits its location (derived from the GPS signal received at the GPS antenna 44') to the system control center (not illustrated) via the long range antenna 36'.

Figure 5:
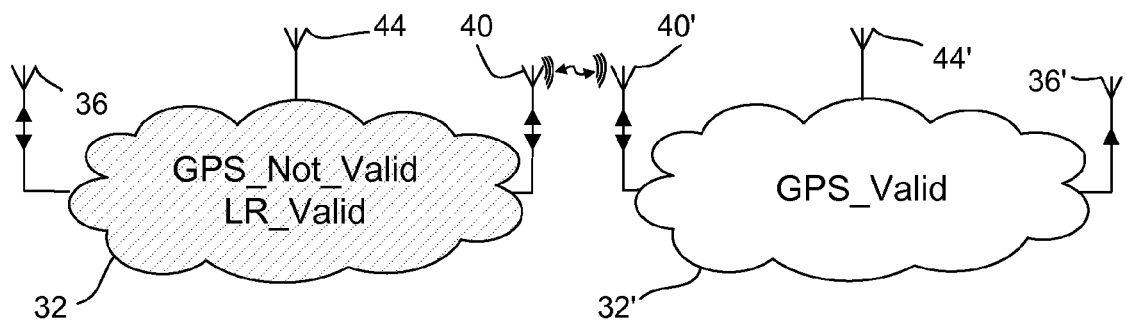

FIG. 5 depicts the invention according to a scenario in which the subject vehicle 32 does not have valid GPS information to return to the system control center in response to the location query received at the long range antenna 36. The vehicle 32 therefore sends a short range location query signal through the short range antenna 40 that is received at the short range antenna 40' and input to the short range receiver 38A' of the proximate vehicle 32'. The vehicle 32' determines its location from signals received at its GPS antenna 44' and returns the location information to the vehicle 32 via the short range path between the short range antennas 40 and 40'. The vehicle 32 returns the location information to the system control center through the long range transmitter 34A and the long range antenna 36.

Figure 6:
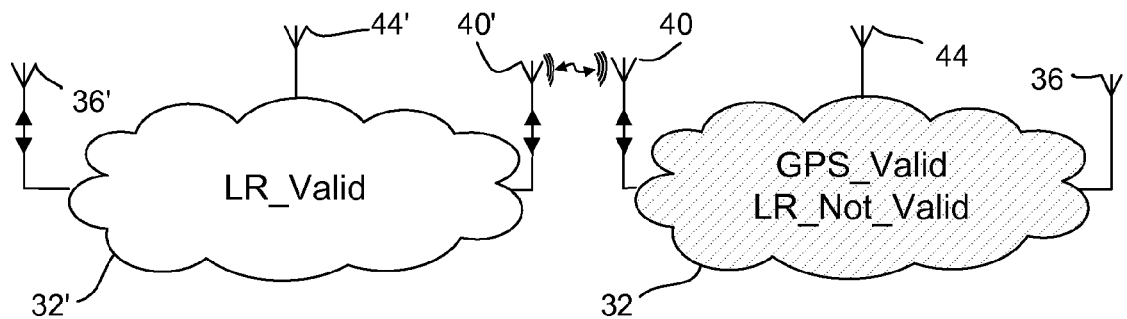

FIG. 6 describes a scenario where the subject vehicle 32 cannot be reached directly via a long range signal but has valid GPS location data. To determine the location of the subject vehicle 32, a location request for the subject vehicle 32 is broadcast to all vehicles (including the secondary vehicle 32') in the network system as controlled by the system control center. The location request signal is received at the long range antenna 36' of the secondary vehicle 32' and responsive thereto a short range location query signal is transmitted from the short range antenna 40'. The short range location query message is received by the short range antenna 40 of the subject vehicle 32 (when the subject vehicle 32 and the secondary vehicle 32' are within the short range distance) and an acknowledgement signal returned to the secondary vehicle 32' (this process is also referred to as a handshake). The return acknowledgment signal further includes the location of the subject vehicle 32 as determined by the GPS receiver 42 (operating through the GPS antenna 44) onboard the subject vehicle 32. When the reply signal is received, the secondary vehicle 32' transmits the location of the subject vehicle 32 to the system control center via the long range antenna 36'.

Figure 7:
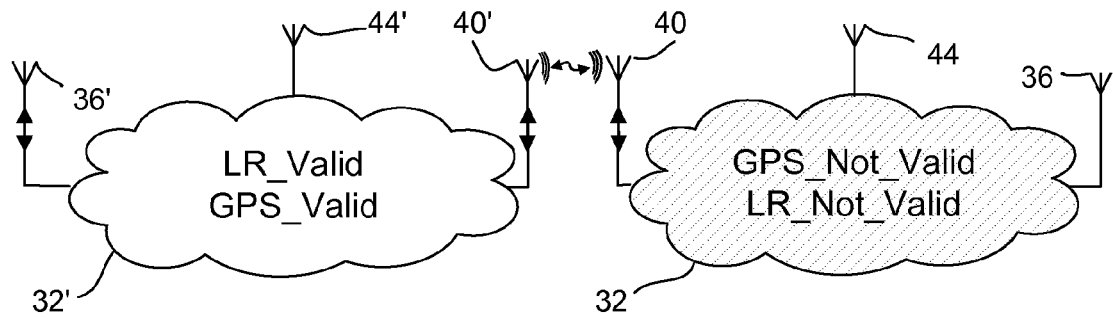

FIG. 7 describes a scenario where the subject vehicle 32 cannot be reached directly via the long range communications path and does not have GPS location data. The system control center broadcasts a request to all vehicles (including the secondary vehicle 32') to locate the subject vehicle 32 by exchanging a short range signal or packet with the vehicle 32. Responsive to the broadcasted request, the vehicle 32' sends a short range message intended for the vehicle 32, and if the handshake is completed, i.e., the vehicle 32 replies, the vehicle 32' transmits its location, as determined from the GPS signals received at the GPS antenna 44', to the system control center. Since the vehicles 32 and 32' are within the short range distance, the maximum error associated with the location of the subject vehicle 32 is the short range distance.

Figure 8:
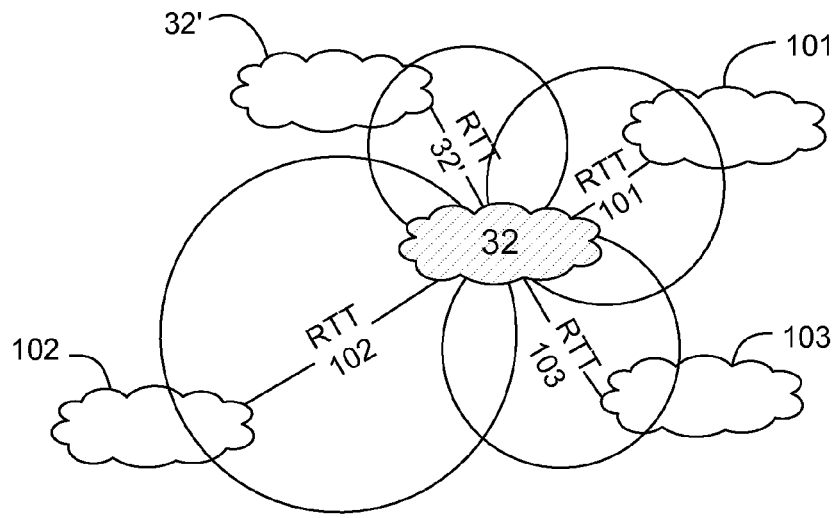

FIG. 8 describes an embodiment where the subject vehicle 32 lacks valid GPS location information. According to this embodiment, the subject vehicle 32 transmits a signal via the short range antenna 40 (not illustrated in FIG. 8) that is intended for receiving by any proximate vehicle, including the secondary vehicle 32' and other secondary vehicles 101, 102, and 103. Each of the vehicles 32', 101, 102 and 103 has a known location as determined by an onboard GPS receiver. Each receiving vehicle exchanges a unicast message with the subject vehicle 32 and at each vehicle 32', 101, 102 and 103 the signal round trip time (i.e., the time for the signal to propagate from the vehicle 32', 101, 102 and 103 to the subject vehicle 32 plus the propagation time of the return signal from the subject vehicle 32) is calculated. Since the speed of electromagnetic energy propagation is known, the microcontroller within each vehicle 32', 101, 102 and 103 calculates the distance (d) from the subject vehicle 32 to each of the vehicles 32', 101, 102, and 103. Each vehicle 32', 101, 102 and 103 transmits its GPS-determined location and the distance to the subject vehicle 32 to the system control center where the received data is analyzed to determine the location of the subject vehicle 32.

In another embodiment, the vehicles 32', 101, 102 and 103 receiving the short range signal relay the signal to other vehicles using any local area network technology (e.g., Zigbee, point-to-point, etc) and topology (star, cluster, mesh, etc.).

Figure 9:
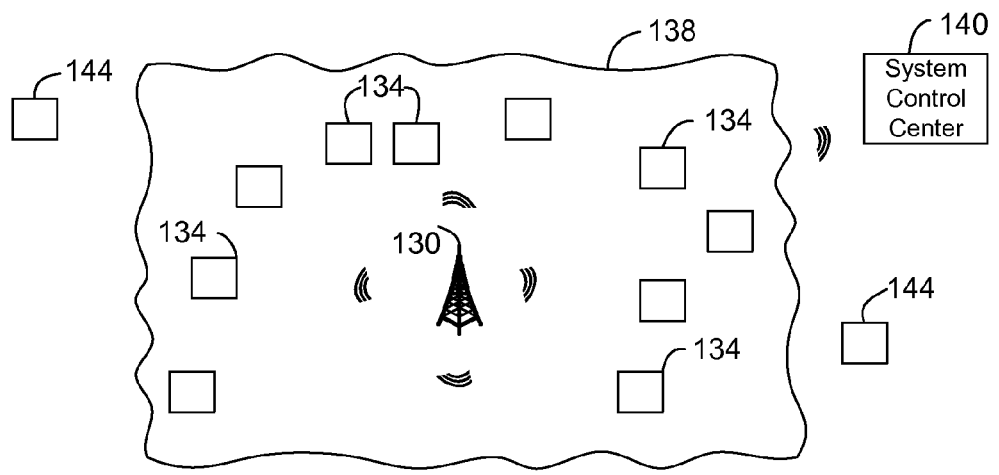

FIG. 9 describes an embodiment related to an area confinement feature of the present invention. A periodic heartbeat signal is transmitted from a vehicle or fixed location 130 using the short range transmitter. The vehicles or objects 134 within the area 138 receive the heartbeat signal and do not send a signal to the control center 140. The vehicles or objects outside the area 138 do not receive the heartbeat signal and transmit the long range signal, which includes location information of the transmitting vehicle or object, to the system control center 140. Thus vehicles or objects outside the boundary of the area 138 send their location information to the control center 140. Vehicles or objects within the area 138 do not send location information, but their location is known to be within the area 138.

In another embodiment, for example when used within a building, the vehicles or objects receiving the heartbeat signal may relay the signal to other vehicles or objects within the building and within the confinement area.

In the various described embodiments it may be desirable for one vehicle or object to relay commands or messages to other vehicles or objects that are not able to receive the initial command or message. For example, a first object may request location information (e.g., a GPS-derived location) from a second object when the second object cannot be reached by the initial request for location information.

According to the various presented applications and embodiments of the present invention, the referred-to object may comprise a vehicle, a person or any object the location for which is desired.

While the present invention has been described with reference to preferred embodiments, it will be understood by those skilled in the art that various changes may be made and functionally equivalent elements may be substituted for the elements thereof without departing from the scope of the invention. The scope of the present invention further includes any combination of elements from the various described embodiments. In addition, modifications may be made to adapt a particular situation to the teachings of the present invention without departing from its essential scope. Therefore, it is intended that the invention not be limited to the particular embodiments disclosed, but that the invention includes all embodiments falling within the scope of the appended claims.

What is claimed is:

1. A system comprising a short range and a long range communications channel and a control center for transmitting location query messages and receiving location information, the system comprising:
   one or more of a first GPS receiver, a first long range transceiver and a first short range transceiver onboard a subject object, the subject object at a first location;
   one or more of a second GPS receiver, a second long range transceiver and a second short range transceiver onboard a secondary object, the secondary object at a second location;
   the control center for transmitting, on the long range communications channel, the location query message requesting first location information;
   responsive to the location query message, the first long range transceiver transmitting the first location information to the control center, or the first short range transceiver transmitting the first location information and an identification of the subject object to the second short range transceiver and the second long range transceiver transmitting the first location information and the identification of the subject object to the control center, or the second long range transceiver transmitting the second location information to the control center when the subject object and the secondary object are within a predetermined distance; and
   wherein the location query message is received at the second long range transceiver and responsive thereto the second short range transceiver transmitting the location query message and an identification of the subject object for receiving by the first short range transceiver, responsive thereto the first short range transceiver transmitting the first location information for receiving by the second short range transceiver, responsive thereto the second long range transceiver transmitting the first location information to the control center, wherein the second short range transceiver transmits the location query message and the identification of the subject object for one of a predetermined time interval, a predetermined number of transmissions and until a stop message is received by the second long range transceiver from the control center.

* * * * *